2,853,414

WATER-INSOLUBLE COMPLEX OF QUATERNARY AMMONIUM SALT, A HEAVY-METAL OXIDE, AND AN ORGANIC COLLOID AND METHOD OF PREPARING SAME

Ernest L. Wimmer, Scott Township, Vanderburgh County, Ind., assignor to The American Sugar Refining Company, New York, N. Y., a corporation of New Jersey No Drawing. Application December 2, 1953
Serial No. 395,853

8 Claims. (Cl. 167—22)

This invention relates to a new composition of matter with bactericidal and fungicidal properties and capable of being formed into films.

The new compounds are insoluble in water and provide an insoluble active source of heavy metal ion, a quaternary ammonium compound and a continuous protective film.

The new compounds are composed of hydrated heavy metal oxides, a quaternary ammonium salt and a high molecular weight hydrophilic colloid capable of forming water-soluble coordination compounds with the heavy metal hydrated oxides. The new insoluble compounds can be considered insoluble heavy metal quaternary ammonium salt complexes of hydrophilic colloids.

Various heavy metals can be used in the form of their hydrated oxides in making the new compounds. Compounds made of copper are particularly advantageous. Other heavy metals such as chromium, iron, cobalt and nickel can also be used. These metals can be initially used in the form of their sulphate or chloride salts with conversion into the hydrated oxides during the process of treatment.

The quaternary ammonium compounds used in making the new compositions are generally the chloride or bromide salts of quaternary ammonium bases containing at least one high molecular weight alkyl or alkyl aryl group. Various water soluble quaternary ammonium salts are available as cationic surface active sanitizers. Typical of such compounds are alkyldimethylbenzylammonium chloride (Roccal), cetyldimethylammonium bromide (Cetab), disisobutylphenoxyethoxyethyldimethylbenzyl-ammonium chloride (Hyamine 1622), and polyalkylnaphthalenemethylpyridinium chloride (Emcol 888). Such quaternary ammonium compounds are effective bactericides, but their high solubility limits them as permanent protectants against attacks by microorganisms. But in the new compositions, they are combined in the form of an insoluble compound.

The hydrophilic colloids which are used in making the new compounds are generally high molecular weight polyhydric alcohols and their derivatives, which form soluble complexes with metals such as copper, etc. In this group are included polysaccharides, particularly starches and degraded starches, dextrans, pentosans, sorbitans, pectins, vegetable gums such as arabic, karaya, tragacanth and locust beans, soluble cellulose and derivatives such as hydroxyethyl cellulose, methyl cellulose, ethyl cellulose and carboxymethyl cellulose, and synthetic polyols such as polyvinyl alcohol and its derivatives.

In preparing the new compounds of the invention, an aqueous solution of the hydrophilic colloid is generally treated with an aqueous solution of the heavy metal salt, and caustic alkali is then added in regulated amounts with vigorous agitation to form the hydrated metal oxide which is maintained in a soluble condition by the hydrophilic colloid. A solution of the quaternary ammonium salt is then added, and there is precipitated from the solution the new compounds of the invention. When precipitation is complete, the yield of the new composition is almost quantitative.

In making the new compositions, it is important to use the reagents in such concentration and with proper mode of addition so that the hydrated metallic oxides are maintained as a soluble coordination complex before the addition of the quaternary ammonium salt to precipitate the new compound. Thus, if the concentration of the heavy metal salt is excessive or if alkali is added in excess, the coordination compound of the hydrated metal oxide and the hydrophilic colloid may precipitate as a sticky mass. But by proper regulation of the concentrations and mode of addition, the soluble coordination complex is maintained in solution until precipitated by the addition of the quaternary ammonium salt.

The mode of addition of the reagents may be somewhat varied, but it is more advantageous to add the quaternary ammonium compound and bring about the precipitation after the co-ordination compound of the hydrated heavy metal oxide and hydrophilic colloid has been formed in solution rather than to mix the hydrophilic colloid and quaternary ammonium salt together first and then add the soluble metallic salt and caustic alkali to bring about precipitation of the product.

The composition of the new products is definite and reproducible when prepared under the same conditions, such as hereafter referred to. But the composition of the products can be varied over a considerable range by varying the ratios or proportions of the ingredients used in making them.

The process of making the new compositions has the advantage that it can be carried out at ordinary temperatures and that the reaction which results in the precipitation of the new products is practically instantaneous.

In carrying out the process, it is advisable to use demineralized or distilled water or water which is free from hardness, so that undesirable metal hydroxides will not be precipitated under the alkaline conditions which are employed. And it is also desirable to use metal salts and hydrophilic colloids which are free from impurities which would form such undesirable metal hydroxides.

The new products are generally precipitated as crumbly waxy solids which are easily filtered or centrifuged. After washing with water, they may be dried in air or in vacuo and pulverized in ordinary milling or pulverizing equipment.

The new products are also advantageously formed in situ upon fabrics, paper, seeds, leather, etc., by first impregnating or treating such materials in a bath containing the co-ordination compounds formed from the reaction of the hydrated heavy metal oxides and the hydrophilic colloids and by then treating the resulting product in a second bath of quaternary ammonium solution to insolubilize the desired impregnant. By forming the new products in situ in this way, bactericidal and fungicidal properties can be imparted to the material treated by the new products formed in situ therein and thereon.

The invention will be further illustrated by the following specific examples, but it will be understood that the invention is not limited thereto. The dextran referred to in the examples was prepared from sucrose by the microbiological action of the action of the bacteria *L. mesenteroides*. The quaternary ammonium salt used was the alkyldimethylbenzylammonium chloride sold under the trade name "Roccal" and with the alkyl part of the compound derived from cocoanut fatty acid alcohols.

*Example 1.*—50 grams of gum dextran was dispersed to one liter in water. To this was added 200 ml. of a 10% solution of copper sulfate ($CuSO_4.5H_2O$), and the resulting solution was diluted to two liters with water. Then 400 ml. of 1 N caustic soda solution was added with vigorous agitation, and a clear, deep blue solution was obtained. A 2% solution of the quaternary ammonium salt was added, and a light blue precipitate began to form immediately. The addition of the quaternary salt solution was continued until precipitation was substantially complete, the volume of the quaternary salt solution being about 1675 ml. The precipitate was recovered by filtration and washed twice by suspension in one liter of water each time. The precipitate was dried at 70 C. in vacuo to a dark blue-green powder.

This product contains about 50% dextran and about 36.4% quaternary ammonium salt, about 6% of copper, about 4.6% of free hydroxyl, about 6.5% of moisture, about 8.4% of ash, and about 1.4% of nitrogen.

*Example 2.*—5 grams of gum arabic were dissolved in 250 ml. of water. 20 ml. of 10% copper sulfate ($CuSO_4,5H_2O$) was added and then, with vigorous agitation, 40 ml. of 1 N caustic soda solution was slowly added. A solution of 2% quaternary ammonim salt (Roccal) was added to complete the precipitation of the light blue copper-quaternary ammonium complex of the colloid. The precipitate was filtered, washed and dried in vacuo at 70° C.

The resulting product contained about 33% quaternary salt, about 5.76% copper, about 1.65% moisture, and about 9.39% ash.

*Example 3.*—By the same procedure described in Example 2, the gum arabic was replaced by corn starch, which was dispersed by cooking 30 minutes at 15 pounds per square inch. The product produced by the procedure of Example 2 contained about 32% quaternary salt, 6.27% copper, 2.83% moisture and 12.62% ash.

When soluble Lintner starch was similarly used, the product contained about 32% quaternary salt, about 5.61% copper, about 3.36% moisture, and about 12.02% ash.

*Example 4.*—When carboxymethyl cellulose was used in the procedure of Example 2, the product contained about 42.5% quaternary salt, about 7.30% copper, about 1.67% moisture, and about 10.48% ash.

*Example 5.*—Gum tragacanth was used in a modification of the process of Example 2 by adding the quaternary ammonium salt to the reaction before the addition of the caustic. The precipitated product in this case contained about 29% quaternary salt, about 6.22% copper, about 2.23% moisture and about 10.09% ash.

*Example 6.*—This example illustrates products made with varying ratios of copper to colloid, the same amount of dextran being used with varying amounts of copper sulfate. As the copper concentration was increased, it was necessary to increase the volume of water added to prevent the precipitation of the cupric hydroxide or of the dextran-cupric hydroxide complex, when the caustic soda was added. The amount of water required for this purpose can readily be determined by experiment to ensure that sufficient water is present to prevent such precipitation.

5 grams of dextran was dissolved in the amount of water indicated in the following table. Various volumes of 10% copper sulfate ($CuSO_4.5H_2O$) solution were added, and then 1 N caustic soda solution was added until precipitation was just initiated. A 2% solution of the quaternary ammonium salt (Roccal) was then added to complete precipitation. The precipitate was separated by filtration and dried in vacuo.

The following table shows the effect of various ratios of reactants upon the composition of the copper quaternary ammonium complex of dextran:

| Preparation | 1 | 2 | 3 | 4 | 5 |
|---|---|---|---|---|---|
| Ml. $CuSO_4.5H_2O$ (10%) | 10 | 20 | 30 | 40 | 50 |
| Ml. Water to Dissolve Dextran | 300 | 300 | 600 | 1,200 | 2,000 |
| NaOH(1 N) ml | 25 | 40 | 40 | 40 | 40 |
| Quat. Ammonium Salt (ml of 2% Sol'n) | 180 | 170 | 150 | 175 | 175 |
| Yield, g | 7.47 | 7.05 | 6.67 | 5.57 | 8.06 |
| Cu, percent | 3.12 | 6.78 | 7.13 | 12.36 | 12.99 |
| Quat. Ammonium Salt, percent | 36.2 | 29.0 | 21.0 | 19.0 | 17.0 |
| Dextran, percent | 42.0 | 42.0 | 42.0 | 42.0 | 42.0 |
| Ash, percent | 4.42 | 8.45 | 13.27 | 16.91 | 18.00 |
| Moisture | 5.17 | 3.95 | 4.46 | 5.12 | 5.51 |

In the above table and in the preceding examples, illustrating the use of hydrated copper oxides as the heavy metal hydrated oxide, it will be seen that the amount of hydrated oxide, expressed as metallic copper, varies from around 3% to around 13% of the composition, while the quaternary ammonium salt varies from around 17% to around 42% of the composition; while the hydrophilic colloid is present in amount exceeding that of the quaternary ammonium salt.

*Example 7.*—Objects fabricated of leather are generally protected from deterioration by compounds of chromium. The following example illustrates the preparation of the chromium quaternary ammonium salt complex of dextran.

To 500 ml. of 5% dextran solution was added 150 ml. of 10% chromium chloride ($CrCl_3$) solution. With vigorous agitation, 1 liter of 2% quaternary ammonium compound (Roccal) was then added. Sodium hydroxide (1 N) was then added to complete the precipitation of the bright green complex compound. After washing twice in 2 liters of water each time, the product was filtered and dried.

The resulting product contains about 57.2% dextran, 33% quaternary ammonium salt, 11.96% ash as $Cr_2O_3$, 1.27% moisture and 5.28% free hydroxyl.

In the foregoing examples, the new compounds are prepared in the absence of material to be treated therewith. The new compounds can advantageously be formed in situ on articles or materials to be coated or impregnated therewith. Thus, fabrics, paper, and other fibers and cellular materials can be treated to incorporate the new compounds by forming the compounds in situ.

Thus, in the processes of the foregoing examples, fabrics, paper, etc. can be first treated with the solution of the hydrated heavy metal oxide-hydrophilic colloid complex and caustic alkali to effect impregnation or coating of the article or material therewith. And the resulting product containing the hydrated metal oxide-hydrophilic colloid complex can then be treated with the second bath, i. e., the quaternary ammonium salt solution, to precipitate the insoluble heavy metal quaternary ammonium salt complexes of the hydrophilic colloids. The treatment of the fabric, paper, or other material with the two solutions can be carried out according to different methods of procedure, e. g., by running the fabric or paper through the two solutions successively or by applying the respective solutions to one side of the fabric or paper successively and in regulated amounts, or by other methods of procedure for impregnating or coating the material with the two successive solutions which react to precipitate in situ the insoluble compound.

The new compounds are insoluble in water and in organic solvents. They can be used in a finely ground dry state as fungicides, e. g., as dusting compounds or as ingredients of dusting compounds. They can also be formed into emulsions or used as ingredients of emulsions. They can also be formed in situ in and upon base materials to be treated therewith, as above described.

The new products are, however, soluble in solutions which will strongly coordinate the heavy metal ion. The products are thus soluble in aqueous ammonia, which dissolves the product by forming a soluble metal ammonium ion. Various amines and amino alcohols such as triethanolamine will act in a similar manner to dissolve the compounds. Such solutions of the compounds in ammonia, etc., are advantageously used as impregnants for cotton cloth to increase the fungicidal and bactericidal properties and the life of the fabric in an environment which induces accelerated deterioration due to mildew and rot.

When aqueous ammonia solutions of the compounds are applied to the cloth and the ammonia is allowed to evaporate, the insoluble copper quaternary ammonium salt complex of the hydrophilic colloid is deposited as a film within and upon the fibers.

The following example illustrates the method of application of the new products to cotton duck.

Example 8.—37.5 grams of the copper-quaternary ammonium complex of dextran prepared in accordance with Example 1 was triturated in 75 ml. of commercial concentrated ammonium hydroxide solution and the resulting intense blue solution was diluted to 380 ml. with water, giving a concentration of the active composition in the resulting solution of approximately 10%. 12-ounce white cotton duck was soaked in this solution for several minutes and then squeezed thoroughly between tension rollers and allowed to air dry. The cloth was colored a pleasing light green. The copper content was 0.40%. When tested by the soil burial procedure of the U. S. Quartermaster Corps, degradation did not appear for 42 days.

I claim:

1. Compositions with bactericidal and fungicidal properties, said compositions being water-insoluble coordination complexes of (1) a heavy metal hydrated oxide selected from the class which consists of the hydrated oxides of copper, chromium, iron, cobalt and nickel, (2) an organic hydrophilic colloid and (3) a bactericidal water soluble quaternary ammonium salt, the proportions of hydrated metal oxide and colloid being such as to form a water soluble coordination complex in the presence of caustic alkali and in the absence of the quaternary ammonium salt, and the amount of the water soluble quaternary ammonium salt being sufficient to form the insoluble coordination complex, said composition providing an insoluble active source of heavy metal ion and a bactericidal quaternary ammonium salt as a part of the water insoluble complex.

2. Compositions as defined in claim 1 formed in situ on materials forming the support therefor.

3. Compositions as defined in claim 1, in which the hydrophilic colloid is a polysaccharide.

4. Compositions as defined in claim 1, in which the hydrophilic colloid is dextran.

5. Compositions as defined in claim 1, in which hydrated copper oxide is the heavy metal hydrated oxide and is present in the composition in amount corresponding to between about 3% and 13% of metallic copper, and in which the quaternary ammonium salt is present in proportions between about 17% and 42% of the composition.

6. The method of producing water-insoluble compositions having bactericidal and fungicidal properties which comprises reacting together (1) a heavy metal hydrated oxide selected from the class which consists of the hydrated oxides of copper, chromium, iron, cobalt and nickel, (2) and organic hydrophilic colloid, and (3) a bactericidal water soluble quaternary ammonium salt, in aqueous solution and in the presence of caustic alkali, the proportions of hydrated metal oxide and colloid being such as to form a water soluble coordination complex in the presence of caustic alkali and in the absence of the quaternary ammonium salt, and the amount of the water soluble quaternary ammonium salt being sufficient to form an insoluble coordination complex with the hydrated oxide and the colloid, whereby a water insoluble coordination complex of the three ingredients is formed which provides an insoluble active source of heavy metal ion and a bactericidal quaternary ammonium salt as a part of the water insoluble complex.

7. The method of producing water-insoluble compositions having bactericidal and fungicidal properties which comprises first reacting together (1) a heavy metal hydrated oxide selected from the class which consists of the hydrated oxides of copper, chromium, iron, cobalt and nickel, and (2) an organic colloid in aqueous solution and in the presence of caustic alkali, and in proportions to form a water soluble cordination complex in the presence of caustic alkali, and adding to the resulting solution (3) a sufficient amount of a water soluble bacteericidal quaternary ammonium salt to form an insoluble coordination complex with the hydrated oxide and the colloid, whereby a water insoluble cordination complex of the three ingredients is formed which provides an insoluble active source of heavy metal ion and a bactericidal quaternary ammonium salt as a part of the water insoluble complex.

8. The method of producing water insoluble compositions having bactericidal and fungicidal properties in situ upon materials such as fabrics, papers, seeds, and leathers which comprises first treating such materials with a water soluble coordination complex of (1) a heavy metal hydrated oxide selected from the class which consists of the hydrated oxides of copper, chromium, iron, cobalt and nickel and (2) a water soluble organic hydrophilic colloid in aqueous solution and in the presence of caustic alkali, the proportions of hydrated metal oxide and colloid being such as to form a water soluble coordination complex in the presence of caustic alkali, and subsequently treating the material with (3) an amount of a water soluble quaternary ammonium salt sufficient to form an insoluble coordination complex with the hydrated oxide and the colloid, whereby a water insoluble coordination complex of the three ingredients is formed in situ which provides an insoluble active source of heavy metal ion and a bactericidal quaternary ammonium salt as a part of the water insoluble complex.

References Cited in the file of this patent

UNITED STATES PATENTS

| 1,986,881 | Dreyfuss | Jan. 8, 1935 |
| 2,158,485 | Preble | May 16, 1939 |
| 2,457,025 | Benignus | Dec. 21, 1948 |
| 2,688,598 | McNeely | Sept. 7, 1954 |

FOREIGN PATENTS

| 538,129 | Great Britain | July 22, 1941 |

OTHER REFERENCES

Dawson: Chem. Soc. J. (Transl.), vol. 95, 1909, pp. 370–381, p. 377 pert.

Bancroft: "Applied Colloid Chem.," McGraw-Hill, New York, N. Y., 1921, pp. 168–171.

Mellor's Mod. Inorg. Chem., Longmans, Green and Co., New York, N. Y., 1939, pp. 394, 395, 590–592.

Fisher: "Colloidal Dispersions," 1950, Wiley, New York, N. Y., pp. 247–248.